(12) United States Patent
Sun (10) Patent No.: US 11,322,137 B2
(45) Date of Patent: May 3, 2022

(54) VIDEO CAMERA

(71) Applicant: VAION LIMITED, Middlesex (GB)

(72) Inventor: Haohai Sun, Fornebu (NO)

(73) Assignee: Ava Video Security Limited, Uxbridge (GB)

(*) Notice: Subject to any disclaimer, the term of this patent is extended or adjusted under 35 U.S.C. 154(b) by 196 days.

(21) Appl. No.: 16/778,130

(22) Filed: Jan. 31, 2020

(65) Prior Publication Data

US 2020/0252587 A1 Aug. 6, 2020

(30) Foreign Application Priority Data

Feb. 4, 2019 (GB) ..................................... 1901505

(51) Int. Cl.

| | |
|---|---|
| *G10L 15/20* | (2006.01) |
| *G03B 17/02* | (2021.01) |
| *H04N 5/225* | (2006.01) |
| *H04N 7/18* | (2006.01) |
| *G08B 13/196* | (2006.01) |
| *G08B 13/16* | (2006.01) |
| *G08B 29/18* | (2006.01) |
| *G10L 25/51* | (2013.01) |

(Continued)

(52) U.S. Cl.
CPC .............. *G10L 15/20* (2013.01); *G03B 17/02* (2013.01); *G08B 13/1672* (2013.01); *G08B 13/196* (2013.01); *G08B 13/19697* (2013.01); *G08B 29/185* (2013.01); *G10L 25/51* (2013.01); *H04N 5/2259* (2013.01); *H04N 7/18* (2013.01); *H04R 3/005* (2013.01); *G03B 19/18* (2013.01); *H04N 5/2252* (2013.01)

(58) Field of Classification Search
CPC ......... G10L 15/20; G10L 25/51; G03B 17/02; G03B 19/18; G08B 13/1672; G08B 13/196; G08B 13/19697; G08B 29/185; H04N 5/2259; H04N 7/18; H04N 5/2252; H04R 3/005

See application file for complete search history.

(56) References Cited

U.S. PATENT DOCUMENTS

| | | | |
|---|---|---|---|
| 10,079,026 B1 * | 9/2018 | Ebenezer | ............... H04R 25/43 |
| 2005/0088915 A1 | 4/2005 | Lapin et al. | |

(Continued)

OTHER PUBLICATIONS

EP 20154953.2, "Partial European Search Report", dated Jun. 16, 2020, 20 pages.

(Continued)

*Primary Examiner* — Fan S Tsang
*Assistant Examiner* — David Siegel
(74) *Attorney, Agent, or Firm* — Kilpatrick Townsend & Stockton LLP (57) ABSTRACT

A video camera, a computer-implemented method, and a computer-readable storage medium. The video camera including one or more microphones and a processor. The processor is configured to: acquire an output from the or each microphone; apply one or more pre-analysis filters to the or each acquired output, wherein the or each pre-analysis filter determines if the or each acquired output contains a corresponding predetermined feature of interest; and analyse the or each output, when it is determined by the or each pre-analysis filter that the corresponding output contains at least one predetermined feature of interest.

16 Claims, 4 Drawing Sheets

(51) Int. Cl.
    *H04R 3/00*     (2006.01)
    *G03B 19/18*    (2021.01)

(56) References Cited

U.S. PATENT DOCUMENTS

| | | |
|---|---|---|
| 2006/0177071 A1 | 8/2006 | Eskildsen |
| 2008/0309761 A1 | 12/2008 | Kienzle et al. |
| 2010/0259620 A1 | 10/2010 | Beggs et al. |
| 2014/0006026 A1* | 1/2014 | Lamb ................. G10L 17/00 704/246 |
| 2015/0106095 A1 | 4/2015 | Mitchell |
| 2016/0241818 A1* | 8/2016 | Palanisamy ............ G08B 25/08 |
| 2017/0099464 A1 | 4/2017 | Qu et al. |
| 2017/0301203 A1 | 10/2017 | Matsuura |
| 2020/0227039 A1* | 7/2020 | Liu ..................... G10L 15/22 |

OTHER PUBLICATIONS

GB 1901505.6, "Combined Search and Examination Report under Sections 17 and 18(3)", dated Aug. 5, 2019, 6 pages.

\* cited by examiner

VIDEO CAMERA

CROSS-REFERENCE TO RELATED APPLICATION

This application claims priority to Great Britain Application No. 1901505.6, filed Feb. 4, 2019, which is hereby incorporated by reference in its entirety for all purposes.

FIELD OF THE INVENTION

The present invention relates to a video camera, a computer-implemented method, and a computer-readable storage medium.

BACKGROUND

Within the domain of physical security, video cameras play a key role. Increasingly, these video cameras are also fitted with one or more microphones so as to record a corresponding audio signal.

It is of interest to computationally analyse the audio signal from these video cameras, so as to automatically trigger alerts corresponding to events of interest. For example, a gunshot or glass breaking, which may be indicative of a security threat. These alerts can then be transmitted to remote stations.

Sound classification algorithms are typically complex neural networks (e.g. deep neural networks, convolutional neural networks, or region-based convolutional neural networks) which contain multiple neurons across multiple layers. These models can be slow to run on live data, due to their computational complexity, which has in the past precluded them from being used on some audio devices. For example, a full analysis of 100 ms of audio data might take 500 ms, and therefore cannot be done for every 100 ms of audio data if the results of the analysis are to be used within a relevant time scale.

SUMMARY

Accordingly, in a first aspect, the invention provides a video camera including one or more microphones and a processor, wherein the processor is configured to:
  acquire an output from the or each microphone;
  apply one or more pre-analysis filters to the or each acquired output, wherein the or each pre-analysis filter determines if the or each acquired output contains a corresponding predetermined feature of interest; and
  analyse the or each output, when it is determined by the or each pre-analysis filter that the corresponding output contains at least one predetermined feature of interest.

Advantageously, this allows the processor of a video camera to determine which subset of the data captured from a microphone to run a complex model on.

Optional features of the invention will now be set out. These are applicable singly or in any combination with any aspect of the invention.

The analysis performed on the or each filtered output may be a more computationally expensive and/or complex one than the filtering performed the or each pre-analysis filter. The processor may be configured to repeat these steps for a moving time window of the output from the microphone. The output analysed when it is determined by the or each pre-analysis filter that the corresponding output contains at least one predetermined feature of interest may be a filtered output resulting from the or each pre-analysis filter.

The video camera may a closed-circuit television camera, or security camera.

The or each pre-analysis filter may remove true negative data from the or each acquired output. By true negative, it may be meant data which has been determined to a confidence level of 99% to not contain a predetermined feature of interest. The pre-analysis filters may have a high degree of sensitivity, whilst having a relatively low degree of specificity. As such, whilst the pre-analysis filters may reliably identify true negatives, they may register many false positives.

The analysis may be performed when it is determined by the or each pre-analysis filter that the corresponding filtered output contains at least one predetermined feature of interest and when a remaining amount of data in the or each acquired output, after the pre-analysis filter has removed the true-negative data, exceeds a threshold. The threshold may be determined, in part, on an amount of queued data to be processed.

The video camera may include plural microphones. The processor may be configured, before applying the one or more pre-analysis filters, to combine the outputs from two or more of the plurality of microphones to form a virtual microphone. The combination may be performed by beam-forming and/or source separation.

The processor may be configured to add the or each acquired output to a queue when it is determined that the or each filtered output contains at least one predetermined feature of interest, and the processor may be configured to analyse the or each filtered output asynchronously with the step of applying the one or more pre-analysis filters to subsequently acquired outputs.

The at least one predetermined feature of interest may be selected from the list of: a noise louder in volume than an average volume or threshold volume; a noise having a shorter duration than an average duration or threshold duration; a noise corresponding to glass breaking; a noise corresponding to a gunshot; and a noise corresponding to a voice. The average volume, threshold volume, average duration, or threshold duration may have different values for each acquired output. The predetermined features of interest are generally properties of the output acquired from each microphone which are related to, or a result of, an event which is being monitored for by the camera.

The processor may be configured to apply the one or more pre-analysis filters to a first time window of the or each acquired output, and may be configured to analyse a second time window of the corresponding filtered output, and the second time window may be larger than the first time window.

The video camera may have plural microphones, and the processor may be configured to combine the filtered outputs of the microphones before analysis using a weighted sum. The weighted sum may be derived using one or more weighting factors, which may be selected from the list including: a binary choice, based on whether the respective filtered output meets a threshold; a value based on a probability derived by the corresponding filter; and a pre-set weighting value.

The or each pre-analysis filter may output either a binary value indicating whether the acquired output contains a predetermined feature of interest, or a confidence value indicating a probability of the acquired output containing a predetermined feature of interest.

In a second aspect, the invention provides a computer-implemented method of analysing one or more outputs acquired from one or more microphones of a video camera, the method including the steps, performed by a processor of the video camera, of:

acquiring an output from the or each microphone;

applying one or more pre-analysis filters to the or each acquired output, wherein the or each pre-analysis filter determines if the or each acquired output contains a corresponding predetermined feature of interest; and analyse the or each filtered output, when it is determined by the or each pre-analysis filter that the corresponding filtered output contains at least one predetermined feature of interest.

The analysis performed on the or each filtered output may be a more computationally expensive and/or complex one than the filtering performed the or each pre-analysis filter. These steps may be repeated for a moving time window of the output from the microphone. The output analysed when it is determined by the or each pre-analysis filter that the corresponding output contains at least one predetermined feature of interest may be a filtered output resulting from the or each pre-analysis filter.

The or each pre-analysis filter may remove true negative data from the or each acquired output. By true negative, it may be meant data which has been determined to a confidence level of 99% to not contain a predetermined feature of interest. The pre-analysis filters may have a high degree of sensitivity, whilst having a relatively low degree of specificity. As such, whilst the pre-analysis filters may reliably identify true negatives, they may register many false positives.

The analysis may be performed when it is determined by the or each pre-analysis filter that the corresponding filtered output contains at least one predetermined feature of interest and when a remaining amount of data in the or each acquired output, after the pre-analysis filter has removed the true-negative data, exceeds a threshold. The threshold may be determined, in part, on an amount of queued data to be processed.

The video camera may include plural microphones. Before applying the one or more pre-analysis filters, the processor may combine the outputs from two or more of the plurality of microphones to form a virtual microphone. This combination may be performed by beamforming and/or source separation.

The processor may add the or each acquired output to a queue when it is determined that the or each acquired output contains at least one predetermined feature of interest, and may analyse the or each filtered output asynchronously with the step of applying one or more pre-analysis filters to subsequently acquired outputs.

The at least one predetermined feature of interest may be selected from the list of: a noise louder in volume than an average volume or threshold volume; a noise having a shorter duration than an average duration or threshold duration; a noise corresponding to glass breaking; a noise corresponding to a gunshot; and a noise corresponding to a voice. The average volume, threshold volume, average duration, or threshold duration may have different values for each acquired output. The predetermined features of interest are generally properties of the output acquired from each microphone which are related to, or a result of, an event which is being monitored for by the camera.

The processor may apply the one or more pre-analysis filters to a first time window of the or each acquired output, and may be analyse a second time window of the corresponding filtered output, and the second time window may be larger than the first time window.

The video camera may have plural microphones, and the processor may combine the filtered outputs of the microphones using a weighted sum. The weighted sum may be derived using one or more weighting factors, which may be selected from the list including: a binary choice, based on whether the respective filtered output meets a threshold; a value based on a probability derived by the corresponding filter; and a pre-set weighting value.

The or each pre-analysis filter may output either a binary value indicating whether the acquired output contains a predetermined feature of interest, or a confidence value indicating a probability of the acquired output containing a predetermined feature of interest.

Further aspects of the present invention provide: a computer program comprising code which, when run on a processor within a video camera, causes the processor to perform the method of the second aspect; a computer readable medium storing a computer program comprising code which, when run on a processor within a video camera, causes the processor to perform the method of the second aspect; and a processor within a video camera programmed to perform the method of the first aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art. All documents mentioned in this text are incorporated herein by reference.

Figure 1:
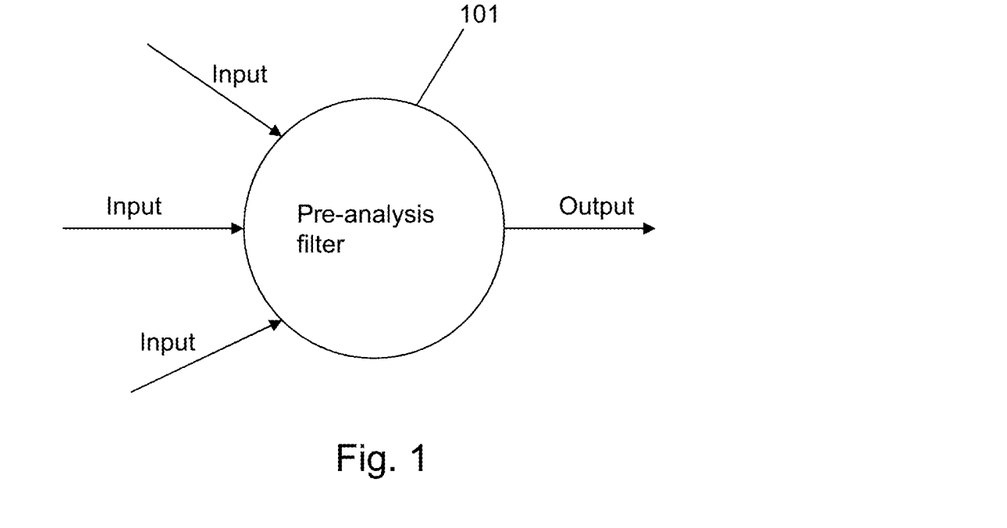
FIG. 1 shows a functional representation of a pre-analysis filter.

FIG. 1 shows a functional representation of a pre-analysis filter 101. The pre-analysis filter may be, for example, a linear classifier such as a logistic regression model. The filter receives one or more inputs, and produces an output. The pre-analysis filter uses domain knowledge, i.e. knowledge about the environment in which the video camera is being used, relevant to the features of interest. For example, the pre-analysis filter may be provided as a pre-trained machine learning classifier such as an artificial neural network (which may comprise only a single neuron). Configuring the pre-analysis filter may include parameter tuning, for example the range of frequencies associated with a feature of interest, the duration and/or power of a feature of interest.

The input to this pre-analysis filter, i.e. the acquired output(s) from one or more microphones, may take many forms. For example, the pre-analysis filter may directly receive raw microphone data. Alternatively, the microphone data may have been processed (e.g. by noise reduction or dereverberation techniques) before being received by the filter. Further alternatives include a spectrogram of microphone data; filtered microphone data (e.g. high-pass, low-pass, band-pass filtered); smoothed microphone data; averaged microphone data (e.g. median, maximum, minimum); or a combination of any of the above (for example, an average of filtered, or spectrogram of smoothed microphone data).

The pre-analysis filters are configured, before implementation in a video camera, to identify specific types of noise. For example, the pre-analysis filters may be designed to identify: a loud noise, a transient noise, glass breaking, gunshots, or voices. Each pre-analysis filter is configured to remove data from the given input which does not contain any of these.

The output of the pre-analysis filter may be a binary signal: present/not present, or a confidence value indicative of the probability that a feature of interest is present.

Figure 2:
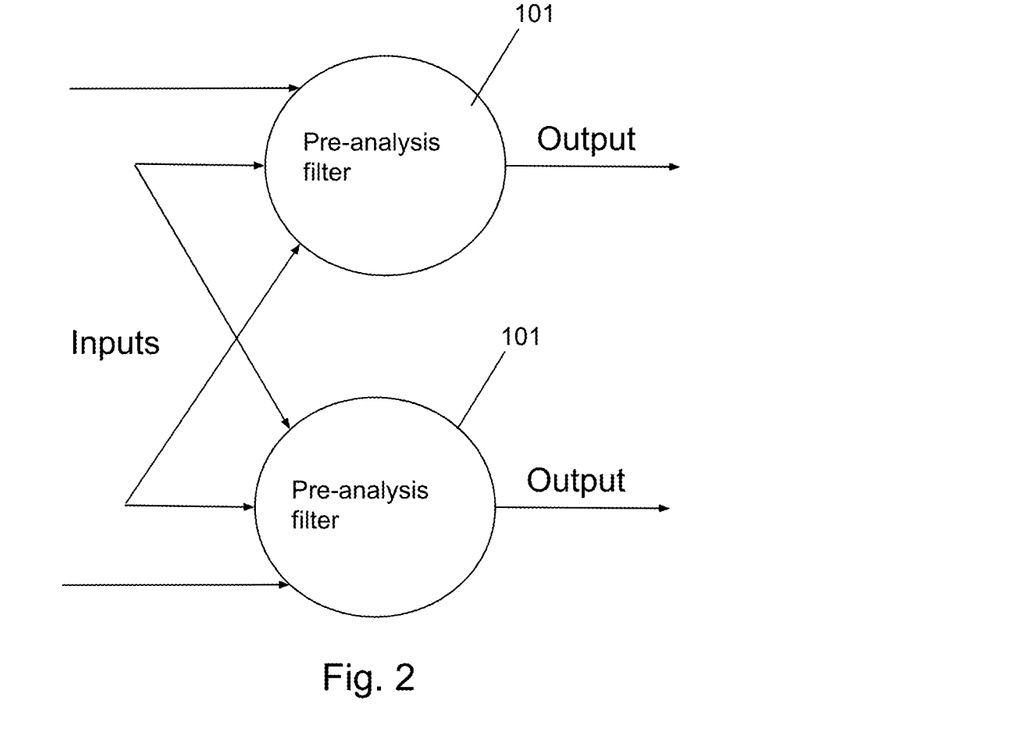
FIG. 2 shows a functional representation of a pair of pre-analysis filters.

FIG. 2 shows a functional representation of a pair of pre-analysis filters 101. Shown in this example, is how inputs can be shared between pre-analysis filters whilst each filter produces its own output.

In both FIG. 1 and FIG. 2, the pre-analysis filter 101 can be configured to produce a single output. The output can be a representation of data acquired from multiple microphones, and may be a weighted sum of the multiple inputs. This can mean that only a single input is provided to subsequent analysis models, which are discussed in more detail below.

Figure 3:
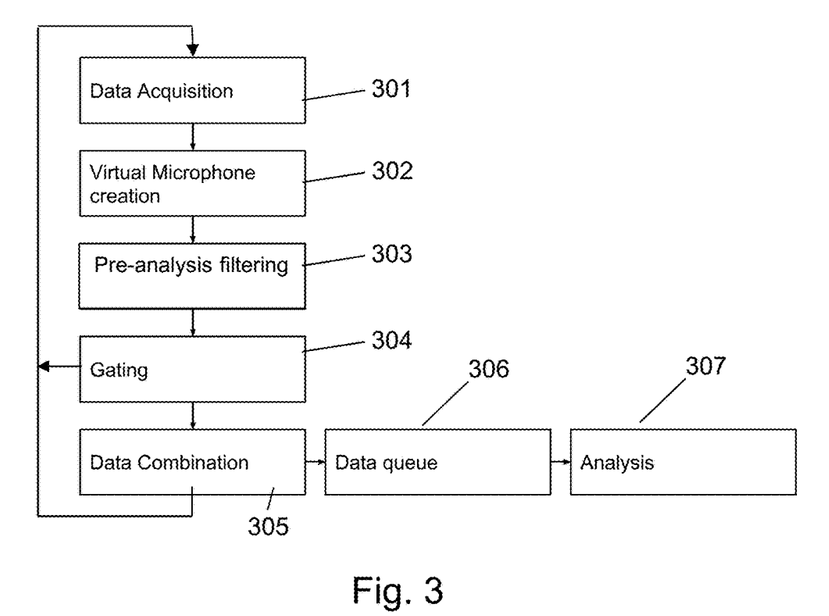
FIG. 3 shows a flow diagram of a method of the present invention.

FIG. 3 shows a flow diagram according to a method of the present invention, at a general level. In a first step, 301, audio data is acquired from one or more microphones located within a video camera. The data may be a stream of data, which a processor of the video camera is subscribed to.

In a subsequent and optional step, step 302, one or more virtual microphones may be created using the data acquired from the one or more microphones. This is discussed in detail with respect to FIG. 4.

Next, in step 303, one or more pre-analysis filters are applied to the or each acquired audio data outputs from the microphones. These pre-analysis filters determine whether the acquired audio output contains a corresponding predetermined feature of interest, as discussed above. The pre-analysis filter may operate on a moving time window of the corresponding audio signal, in a manner discussed in more detail below.

After the filtering step, a decisions is made in step 304 as to whether the filtered data should be further analysed. As discussed already, this decision may be based on whether the amount of data remaining after filtering exceeds a threshold. If the decision is that the filtered data should not be further analysed, the method moves back to step 301 and new data is acquired from the microphone(s). If the decision is that the filtered data should be further analysed, the method may move either to step 305 or directly to step 306. In step 305, the data from one or more microphones is combined. This may include data that, temporally, is before or after that used in the pre-filtering step 303.

In step 306, the data (or combined data, if step 305 has been performed) is added to a queue for further analysis. Finally, this data is analysed more fully in step 307. After step 304, or step 305 if performed, the method returns to step 301 and more data is acquired from the or each microphone. The analysis in step 307 can be performed asynchronously with the acquisition and filtering of subsequent data.

Figure 4:
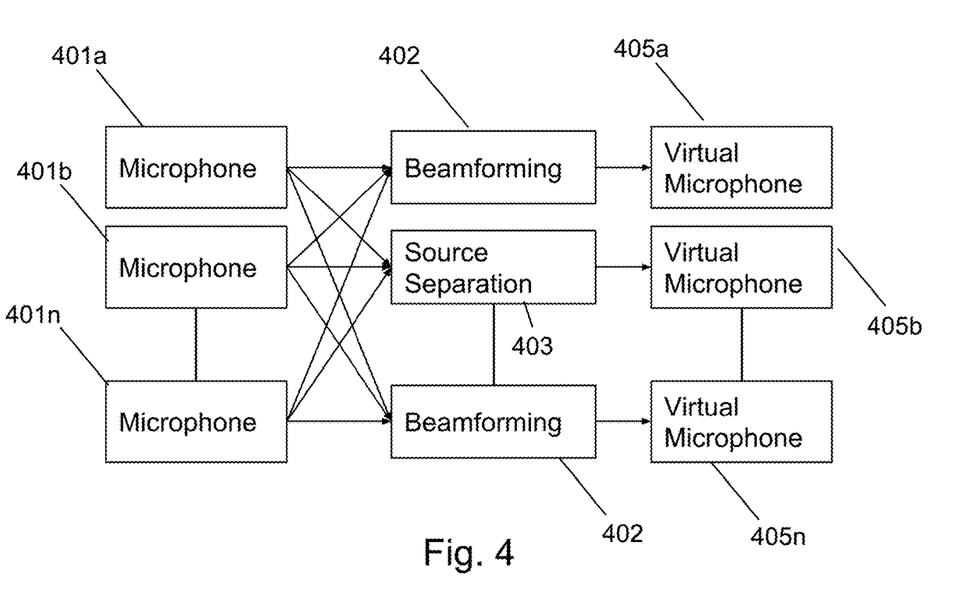
FIG. 4 shows an optional method of forming virtual microphones.

FIG. 4 shows a method of forming one or more virtual microphones. In this method, microphones 401a-401n provide captured audio data to one or more processing modules. For example, beamforming module 402 may receive captured audio data from each of microphones 401a-401n, and may use beamforming techniques known per se to generate a virtual microphone 405b. Alternatively, or additionally, a source separation module 403 may use source separation techniques known per se to generate a virtual microphone 405b. The method is able to generate n virtual microphones. These virtual microphones can be used to 'point' at a specific region of interest, based, for example, on a determination that a noise of interest has been registered in that region.

Figure 5:
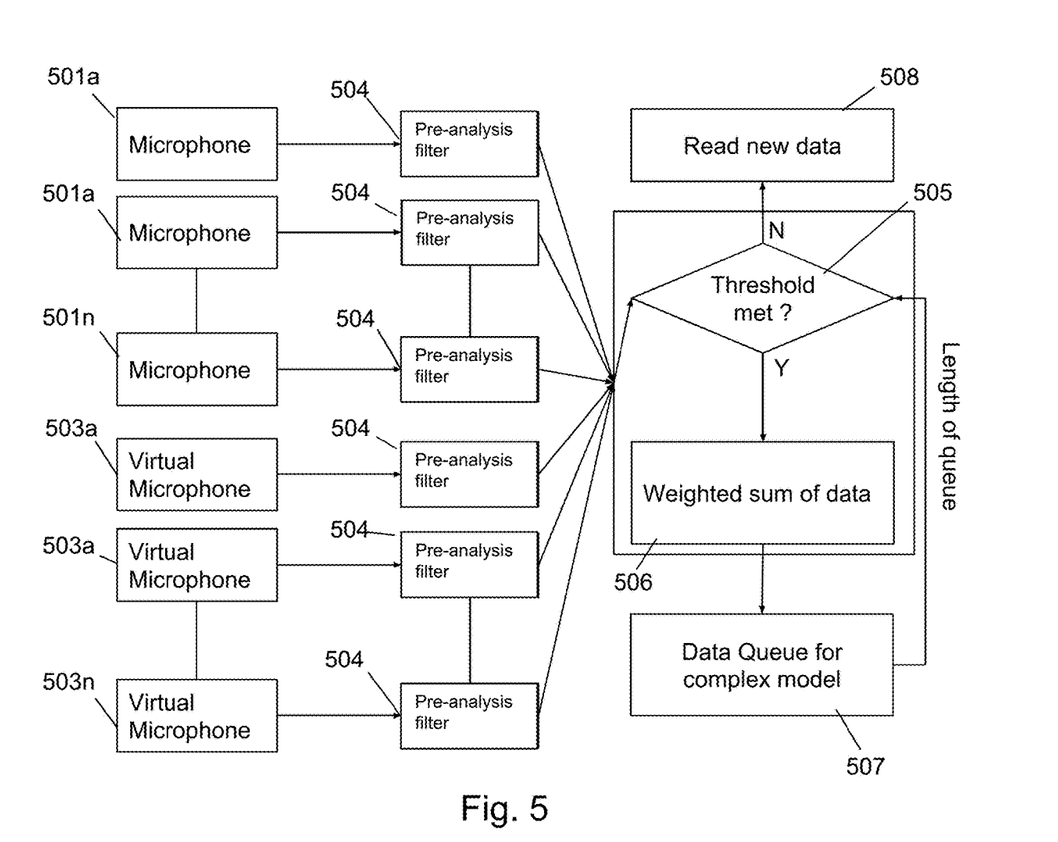
FIG. 5 shows a flow diagram of a method of the present invention.

FIG. 5 shows a flow diagram of a method according to the present invention. Microphones 501a-501n, and virtual microphones 503a-503n (formed, for example, using the techniques above) provide captured audio data to pre-analysis filters 504. Whilst shown as distinct pre-analysis filters, there may of course be a single pre-analysis filter looking for a single predetermined feature of interest which is provided with data from each of the microphones and virtual microphones.

The, or each, pre-analysis filter 504 provides an output, whereupon a decision is made in step 505 as to whether a threshold has been met. If the threshold has not been met, 'N', the method moves to step 508 and new data is acquired from the microphones. If the threshold has been met, 'Y', a weighted sum of the data is derived in step 506. The weighted sum of the data is then sent to a data queue for the more complex analysis in step 507. The length of the queue of data to be analysed is utilised as a factor when deciding whether the threshold has been met in step 505. For example, if the length of the queue of data to be analysed if very large, the threshold may be increased so that it is less likely that new data acquired from the microphones is added to the queue. In contrast, if the length of the queue of data to be analysed is very short, the threshold may be lowered so that it is more likely that new data acquired from the microphones is added to the queue. The threshold may also be a function of the type of feature of interest, and domain knowledge relating to a given microphone. For example, if the microphone of a given camera is in an area where speech is expected or normal, then triggering further analysis based on determining that speech is present is unlikely to be useful. The threshold may be determined based on more than one channel, i.e. more than one captured audio output, and may be based on more than one pre-analysis filter output.

The data provided to the queue in step 507 may either be the original data acquired from the or each microphone, filtered data provided from the or each pre-analysis filter, or a combination thereof.

Figure 6:
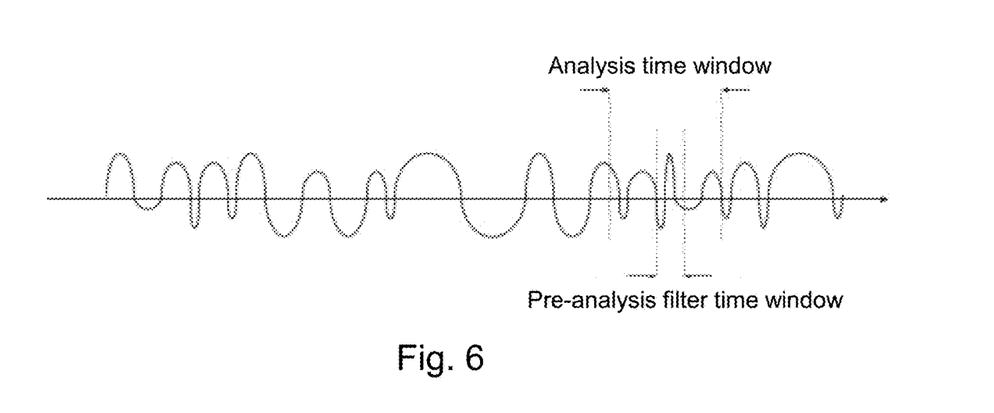
FIG. 6 shows respective time windows of an acquired output signal.

The data provided to the queue in step 507 may be the same time window as used by the or each pre-analysis filter, or it could differ. For example, as shown in FIG. 6, the or each pre-analysis filter may perform its filtering on a small time window, e.g. 100 ms, whereas the more complex analysis may be performed on a larger window e.g. 1-2 seconds. The more complex analysis time window could extend the pre-analysis time window to times before, after, or both.

Figure 7:
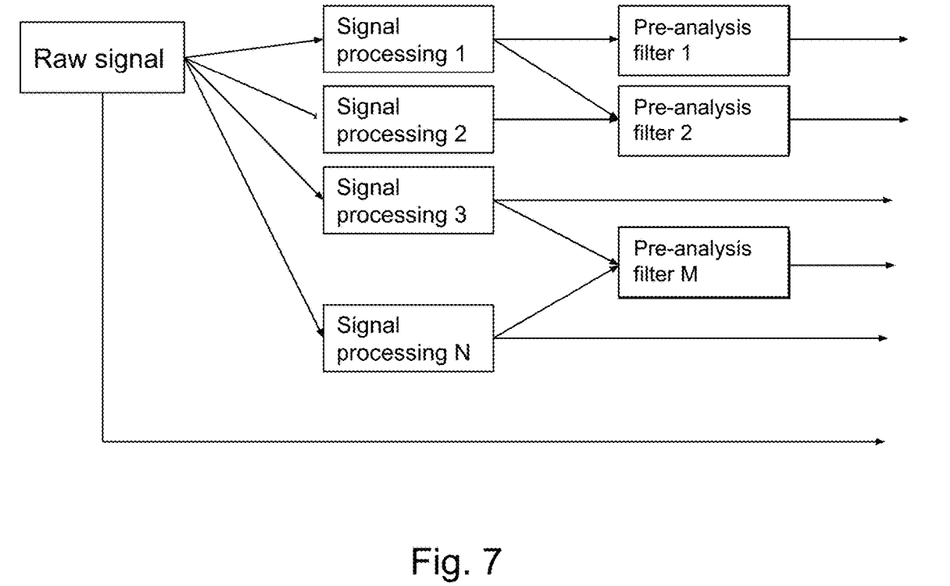
FIG. 7 shows an optional method of signal processing.

FIG. 7 shows an optional method of signal processing which may be performed before data is provided to the or each pre-analysis filters. For example, a raw signal may be provided to one or more signal processing modules and after processing the resulting signal may be provided to the one or more pre-analysis filters. Example signal processing techniques include: filters (high-pass, low-pass, band-pass); fast Fourier transforms, spectrograms, averages, windowing functions, noise reduction, dereverberation, and source separation.

Figure 8:
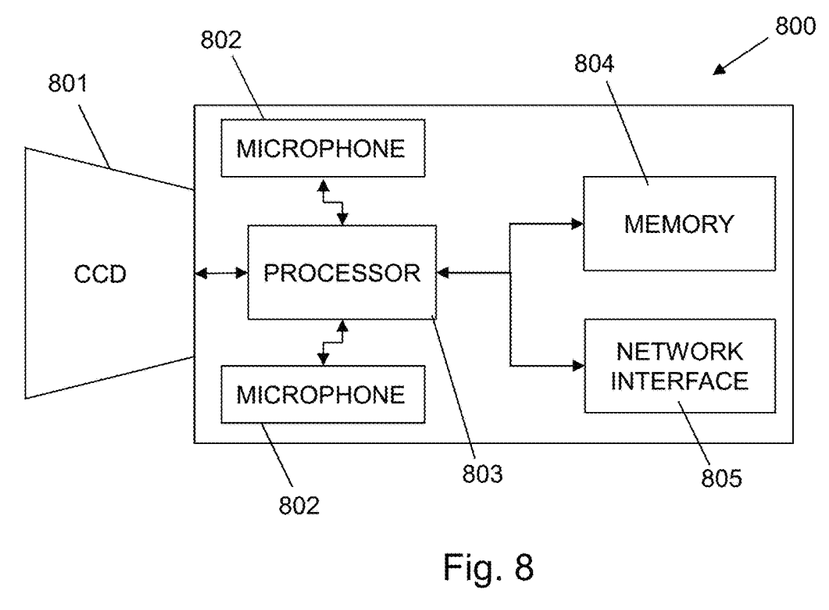
FIG. 8 shows a schematic of a video camera according to the present invention.

FIG. 8 shows a video camera 800 according to the present invention. Broadly, the video camera includes a charge-coupled device (CCD) 801, for capturing video; microphones 802 for capturing sound; processor 803; memory 804; and a network interface 805. The processor is connected to, and receives acquired data from, the CCD and microphones. The processor is also connected to, and exchanges data with, the memory 804. The memory includes instructions which, when executed on the processor, cause the processor to perform the method of the second aspect discussed above using data acquired from the microphones 802. The processor is also connected to, and exchanges data with, the network interface 805. The network interface may be, for example, a wireless network interface (e.g. WiFi®)) or it may be a wired network interface (e.g. Ethernet, or Power over Ethernet interface).

When the processor identifies, from the analysis of the acquired outputs from the microphones, that an event of interest has occurred, it may communicate this via the network interface 805 to a remote server or computer.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A video camera including one or more microphones and a processor, wherein the processor is configured to:
   acquire an output from the one or more microphones;
   apply one or more pre-analysis filters to the acquired output from the one or more microphones, wherein the one or more pre-analysis filters determine if the acquired output contains a corresponding predetermined feature of interest; and
   analyse the acquired output, when it is determined by the one or more pre-analysis filters that the acquired output from the one or more microphones contains at least one predetermined feature of interest;
   wherein the one or more pre-analysis filters remove true-negative data from the acquired output from the one or more microphones; and
   wherein the analysis is performed when it is determined by the one or more pre-analysis filters that the acquired output from the one or more microphones contains at least one predetermined feature of interest and when a remaining amount of data in the acquired output from the one or more microphones, after the one or more pre-analysis filters have removed the true-negative data, exceeds a threshold.

2. The video camera of claim 1, wherein the threshold is determined, in part, on an amount of queued data to be processed.

3. The video camera of claim 1, wherein processor is configured to add the acquired output from the one or more microphones to a queue when it is determined that the acquired output from the one or more microphones contains at least one predetermined feature of interest, and is configured to analyse the acquired output from the one or more microphones asynchronously with the step of applying the one or more pre-analysis filters to subsequently acquired outputs.

4. The video camera of claim 1, wherein the at least one predetermined feature of interest is selected from the list of: a noise louder in volume than an average volume or threshold volume; a noise having a shorter duration than an average duration or threshold duration; a noise corresponding to glass breaking; a noise corresponding to a gunshot; and a noise corresponding to a voice.

5. The video camera of claim 1, wherein the processor is configured to apply the one or more pre-analysis filters to a first time window of the acquired output from the one or more microphones, and is configured to analyse a second time window of the acquired output from the one or more microphones, wherein the second time window is larger than the first time window.

6. The video camera of claim 1, wherein the one or more pre-analysis filters output either a binary value indicating whether the acquired output from the one or more microphones contains a predetermined feature of interest, or a confidence value indicating a probability of the acquired output from the one or more microphones containing a predetermined feature of interest.

7. The video camera of claim 1, including plural microphones, and wherein the processor is configured, before applying the one or more pre-analysis filters, to combine the outputs from two or more of the plurality of microphones to form a virtual microphone.

8. The video camera of claim 7, wherein the combination is performed by beamforming and/or source separation.

9. The video camera of claim 1, including plural microphones, and the processor is configured to combine the outputs of the microphones before analysis using a weighted sum.

10. The video camera of claim 9, wherein the weighted sum is derived using one or more weighting factors selected from the list including: a binary choice, based on whether the respective output meets a threshold; a value based on a probability derived by the corresponding filter; and a pre-set weighting value.

11. A computer-implemented method of analysing an output acquired from one or more microphones of a video camera, the method including the steps, performed by a processor of the video camera, of:
   acquiring an output from the one or more microphones;
   applying one or more pre-analysis filters to the acquired output from the one or more microphones, wherein the one or more pre-analysis filters determine if the acquired output from the one or more microphones contains a corresponding predetermined feature of interest; and
   analyse the acquired output from the one or more microphones, when it is determined by the one or more pre-analysis filters that the acquired output contains at least one predetermined feature of interest;
   wherein the one or more pre-analysis filters remove true-negative data from the acquired output from the one or more microphones; and
   wherein the analysis is performed when it is determined by the one or more pre-analysis filters that the acquired output from the one or more microphones contains at least one predetermined feature of interest and when a remaining amount of data in the acquired output from the one or more microphones, after the one or more pre-analysis filters have removed the true-negative data, exceeds a threshold.

12. The computer-implemented method of claim 11, wherein the threshold is determined, in part, on an amount of queued data to be processed.

13. The computer-implemented method of claim 11, wherein the processor adds the acquired output from the one or more microphones to a queue when it is determined that the acquired output from the one or more microphones contains at least one predetermined feature of interest, and analyses the acquired output from the one or more microphones asynchronously with the step of applying the one or more pre-analysis filters to subsequently acquired outputs.

14. The computer-implemented method of claim 11, wherein the processor applies the one or more pre-analysis filters to a first time window of the acquired output from the one or more microphones, and analyses a second time window of the acquired output from the one or more microphones, wherein the second time window is larger than the first time window.

15. The computer-implemented method of claim 11, wherein there are plural microphones, and, before applying the one or more pre-analysis filters, the processor combines the outputs from two or more of the plurality of microphones to form a virtual microphone.

16. The computer-implemented method of claim 15, wherein the combination is performed by beamforming and/or source separation.

\* \* \* \* \*